(12) United States Patent
Hoshino et al.

(10) Patent No.: US 10,889,289 B2
(45) Date of Patent: Jan. 12, 2021

(54) VEHICLE AND CONTROL METHOD FOR VEHICLE

(71) Applicant: HONDA MOTOR CO., LTD., Tokyo (JP)

(72) Inventors: Daisuke Hoshino, Wako (JP); Yutaka Arimura, Wako (JP); Tatsuya Ohzu, Wako (JP); Shingo Soma, Wako (JP); Yosuke Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 16/283,370

(22) Filed: Feb. 22, 2019

(65) Prior Publication Data

US 2019/0263388 A1    Aug. 29, 2019

(30) Foreign Application Priority Data

Feb. 23, 2018 (JP) .................................. 2018-030912

(51) Int. Cl.
*B60W 20/00* (2016.01)
*B60W 10/06* (2006.01)
(Continued)

(52) U.S. Cl.
CPC ............ *B60W 20/40* (2013.01); *B60W 10/06* (2013.01); *B60W 10/08* (2013.01); *B60K 6/442* (2013.01);
(Continued)

(58) Field of Classification Search
CPC ...... B60W 20/40; B60W 10/06; B60W 10/08; B60W 2900/00; B60W 2510/0657; B60K 6/442
(Continued)

(56) References Cited

U.S. PATENT DOCUMENTS 8,840,516 B2 *  9/2014  Murata ................... F16F 15/18
                                                   475/267
9,499,158 B2 * 11/2016  Watanabe ........... B60L 15/2009
(Continued)

FOREIGN PATENT DOCUMENTS

JP      2000-069607 A     3/2000
JP      2000-324607 A    11/2000
(Continued)

OTHER PUBLICATIONS

Adaptive Harmonic and Disturbance Estimators for Rotary Machines with applications to Engines; Raja Sangilivadamalu; Christian Beidl; IEEE/ASME Transactions on Mechatronics, IEEE Article. (Year: 2020).*

(Continued)

*Primary Examiner* — Cuong H Nguyen
(74) *Attorney, Agent, or Firm* — Carrier Blackman & Associates, P.C.; Joseph P. Carrier; William D. Blackman

(57) ABSTRACT

A vehicle is equipped with a torque sensor configured to detect a torque, and which is disposed on a second transmission path connecting a first rotary electric machine and a first branch point on a first transmission path. When a first switching device is placed in a connected state and a vehicle wheel is driven by an internal combustion engine, a control device causes an inverted phase torque, which is opposite in phase to a detected torque detected by the torque sensor, to be generated in the first rotary electric machine.

5 Claims, 4 Drawing Sheets

(51) Int. Cl.
  *B60W 10/08* (2006.01)
  *B60W 20/40* (2016.01)
  *B60K 6/442* (2007.10)

(52) U.S. Cl.
  CPC .............. *B60W 2510/0657* (2013.01); *B60W 2510/083* (2013.01); *B60W 2900/00* (2013.01)

(58) Field of Classification Search
  USPC ..... 701/22, 53–54; 192/54.1, 31; 180/65.28, 180/65.21
  See application file for complete search history.

(56) References Cited

U.S. PATENT DOCUMENTS

| | | | |
|---|---|---|---|
| 9,517,704 B2 * | 12/2016 | Hashimoto | ........... B60L 3/0061 |
| 9,887,656 B2 * | 2/2018 | Hijikata | ................. H02K 21/16 |
| 10,232,842 B2 | 3/2019 | Kawai et al. | |
| 10,351,002 B2 * | 7/2019 | Saha | ......................... H02P 3/24 |
| 10,414,287 B2 * | 9/2019 | Hashimoto | ............. H02P 23/04 |
| 2009/0266179 A1 | 10/2009 | Oniwa et al. | |
| 2012/0190495 A1 * | 7/2012 | Murata | ................... F16F 15/18 475/257 |
| 2013/0192417 A1 | 8/2013 | Fujita et al. | |
| 2015/0314772 A1 * | 11/2015 | Watanabe | ............. B60W 20/30 477/3 |
| 2016/0056739 A1 * | 2/2016 | Hashimoto | ............. H02P 29/50 318/400.09 |
| 2017/0126161 A1 * | 5/2017 | Hijikata | ............... H02K 1/2706 |
| 2017/0158043 A1 | 6/2017 | Tsukamoto | |
| 2017/0217332 A1 * | 8/2017 | Hashimoto | ............. H02P 27/06 |
| 2017/0305274 A1 * | 10/2017 | Saha | ........................ H02P 3/24 |

FOREIGN PATENT DOCUMENTS

| | | | | |
|---|---|---|---|---|
| JP | 2004-208473 A | | 7/2004 | |
| JP | 2009-264812 A | | 11/2009 | |
| JP | 2016-124314 A | | 7/2016 | |
| JP | 2017-100590 A | | 6/2017 | |
| JP | 2017-124747 A | | 7/2017 | |
| WO | 2012/053361 A1 | | 4/2012 | |
| WO | WO-2012060004 A1 * | 5/2012 | .......... F16F 15/1206 |
| WO | WO-2014080775 A1 * | 5/2014 | ............ B60L 3/0061 |
| WO | WO-2015147120 A1 * | 10/2015 | .............. H02P 21/00 |
| WO | WO-2016021696 A1 * | 2/2016 | ............ H02P 29/028 |
| WO | WO-2016076429 A1 * | 5/2016 | ............... H02H 7/18 |

OTHER PUBLICATIONS

Flux-Switching Permanent Magnet Machines: A Review of Opportunities and Challenges—Part I: Fundamentals and Topologies H Chen, AM EL-Refaie et al—IEEE Transactions on Energy Conversion, 2019—ieeexplore.ieee.org (Year: 2019).*

Research on Starting/Generating System Based on Permanet Magnet Machine for Vehicle Application; Z Sun, D Yin—22nd International Conference on Electrical Machines and Systems (ICEMS); 2019—ieeexplore.ieee.org (Year: 2019).*

Office Action dated Jun. 18, 2019 issued over the corresponding Japanese patent application 2018-030912 with the English translation thereof.

Office Action dated Jan. 7, 2020 issued over the corresponding Japanese Patent Application 2018-030912 with the English translation thereof.

Office Action dated Oct. 8, 2019 issued over the correponding Japanese Patent Application No. 2018-030912 with English translation thereof.

* cited by examiner

VEHICLE AND CONTROL METHOD FOR VEHICLE

CROSS-REFERENCE TO RELATED APPLICATION

This application is based upon and claims the benefit of priority from Japanese Patent Application No. 2018-030912 filed on Feb. 23, 2018, the contents of which are incorporated herein by reference.

BACKGROUND OF THE INVENTION

Field of the Invention

The present invention relates to a vehicle equipped with an internal combustion engine and a rotary electric machine, as well as to a method for controlling such a vehicle.

Description of the Related Art

Japanese Laid-Open Patent Publication No. 2017-100590 has the object of providing a vehicle capable of realizing one or both of an improvement in fuel consumption efficiency, and an improvement in travel performance of the vehicle (paragraph [0008], abstract). In order to achieve this object, the vehicle 10 disclosed in Japanese Laid-Open Patent Publication No. 2017-100590 (see abstract and FIG. 1) comprises an internal combustion engine 20, a first rotary electric machine 22, a second rotary electric machine 24, a first switching device 26, a second switching device 28, and a control circuit 54. In the event that the vehicle velocity V exceeds a first vehicle velocity threshold value in a state in which the first switching device 26 is in a connected state, and power is being transmitted from the internal combustion engine 20 to a vehicle wheel 36, the control circuit 54 controls the second switching device 28 to be placed in a disconnected state.

SUMMARY OF THE INVENTION

As noted above, according to Japanese Laid-Open Patent Publication No. 2017-100590, in order to enhance fuel consumption efficiency or to improve the travel performance of the vehicle, in a state in which power is being transmitted from the internal combustion engine 20 to the vehicle wheel 36, in the case that the vehicle velocity V exceeds the first vehicle velocity threshold value, the second switching device 28 is controlled to be placed in a disconnected state (abstract). However, room remains for improvement in relation to the method of utilizing the first rotary electric machine 22 or the second rotary electric machine 24 which are capable of being connected to the internal combustion engine 20.

For example, in the case that the internal combustion engine 20 is a four-cycle engine, in the torque generated by the internal combustion engine 20, pulsations may occur in accordance with a change in the rotational speed of the internal combustion engine 20 in each cycle. Pulsations of this type may hinder smooth rotation of the vehicle wheel. In Japanese Laid-Open Patent Publication No. 2017-100590, no consideration is given concerning the suppression of pulsations in relation to the first rotary electric machine 22 or the second rotary electric machine 24.

The present invention has been devised taking into consideration the aforementioned problems, and has the object of providing a vehicle and a control method for such a vehicle, which are capable of smoothly rotating a vehicle wheel by suppressing torque pulsations of an internal combustion engine.

A vehicle according to the present invention comprises:
an internal combustion engine;
a first transmission path configured to transmit power generated by the internal combustion engine to a vehicle wheel;
a first switching device disposed on the first transmission path, and configured to switch between a connected state and a disconnected state between the internal combustion engine and the vehicle wheel;
a first rotary electric machine;
a second transmission path connecting the first rotary electric machine and a first branch point on the first transmission path; and
a control device configured to control the internal combustion engine, the first switching device, and the first rotary electric machine;
the vehicle further comprising a torque sensor configured to detect a torque, and which is disposed on the second transmission path;
wherein, when the first switching device is placed in a connected state and the vehicle wheel is driven by the internal combustion engine, the control device causes an inverted phase torque, which is opposite in phase to a detected torque detected by the torque sensor, to be generated in the first rotary electric machine.

According to the present invention, when the first switching device is placed in a connected state and the vehicle wheel is driven from the internal combustion engine, the first rotary electric machine is made to generate the inverted phase torque which is opposite in phase to the detected torque detected by the torque sensor. Because the torque sensor is disposed on the second transmission path, in the case that the detected torque is not used for generating electrical power or the like by the first rotary electric machine, the detected torque is indicative of pulsations of the internal combustion engine. Accordingly, by causing the inverted phase torque, which is opposite in phase to the detected torque, to be generated in the first rotary electric machine, pulsations of the internal combustion engine can be suppressed and the vehicle wheel can be smoothly rotated.

The torque sensor can be, for example, a magnetostrictive torque sensor disposed on an input/output shaft of the first rotary electric machine. In accordance with this feature, it is possible to detect the torque of the first rotary electric machine with high accuracy, and to effectively generate the inverted phase torque.

The first branch point may be provided more on a side of the internal combustion engine than the first switching device within the first transmission path. Further, the vehicle may further include a second rotary electric machine, and a third transmission path connecting the second rotary electric machine and a second branch point located more on a side of the vehicle wheel than the first switching device within the first transmission path. Furthermore, on a basis of travel information of the vehicle, the control device may be configured to switch between a rotary electric machine travel mode in which the vehicle wheel is driven by the second rotary electric machine in a state in which the first switching device is in a disconnected state, and an internal combustion engine travel mode in which the vehicle wheel is driven by the internal combustion engine in a state in which the first switching device is in a connected state.

In accordance with these features, in the rotary electric machine travel mode, the torque sensor is disconnected from the power transmission path to the vehicle wheel, whereas in the internal combustion engine travel mode, the torque sensor is connected with the power transmission path to the vehicle wheel. Accordingly, in comparison with a case of being disposed in the third transmission path or the like, it becomes easier for the torque sensor to detect a change when switching from the rotary electric machine travel mode to the internal combustion engine travel mode.

When the first switching device is placed in a connected state and the vehicle wheel is driven by the internal combustion engine, the control device calculates a target value of the inverted phase torque or an index corresponding thereto, in a manner so that a sum of the detected torque and the inverted phase torque becomes zero or a value close to zero. In accordance with this feature, when the torque transmitted from the first transmission path to the second transmission path is not used for generating electrical power by the first rotary electric machine, pulsations of the internal combustion engine can be suppressed, and the vehicle wheel can be smoothly rotated.

When the first switching device is placed in a connected state and the vehicle wheel is driven from the internal combustion engine, the control device may determine whether or not generation of electrical power by the first rotary electric machine is required. In the case it is determined that generation of electrical power by the first rotary electric machine is required, the control device may calculate a target torque of the first rotary electric machine by adding the inverted phase torque to a target generated torque of the first rotary electric machine. In the case it is determined that generation of electrical power by the first rotary electric machine is not required, the control device may calculate the target torque in a manner so that the sum of the detected torque and the inverted phase torque becomes zero or a value close to zero.

In accordance with these features, it becomes possible to suppress pulsations of the internal combustion engine, and to smoothly rotate the vehicle wheel, both in the case that generation of electrical power by the first rotary electric machine is required, as well as in the case that generation of electrical power is not required.

In a control method for controlling a vehicle according to the present invention, the vehicle comprises:

an internal combustion engine;

a first transmission path configured to transmit power generated by the internal combustion engine to a vehicle wheel;

a first switching device disposed on the first transmission path, and configured to switch between a connected state and a disconnected state between the internal combustion engine and the vehicle wheel;

a first rotary electric machine;

a second transmission path connecting the first rotary electric machine and a first branch point on the first transmission path; and a control device configured to control the internal combustion engine, the first switching device, and the first rotary electric machine;

the vehicle further comprising a torque sensor configured to detect a torque, and which is disposed on the second transmission path;

wherein, when the first switching device is placed in a connected state and the vehicle wheel is driven by the internal combustion engine, the control device performs a step of causing an inverted phase torque, which is opposite in phase to a detected torque detected by the torque sensor, to be generated in the first rotary electric machine.

According to the present invention, torque pulsations of the internal combustion engine can be suppressed, and the vehicle wheel can be smoothly rotated.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A. Present Embodiment
<A-1. Configuration of Present Embodiment>
[A-1-1. Overall Configuration]

Figure 1:
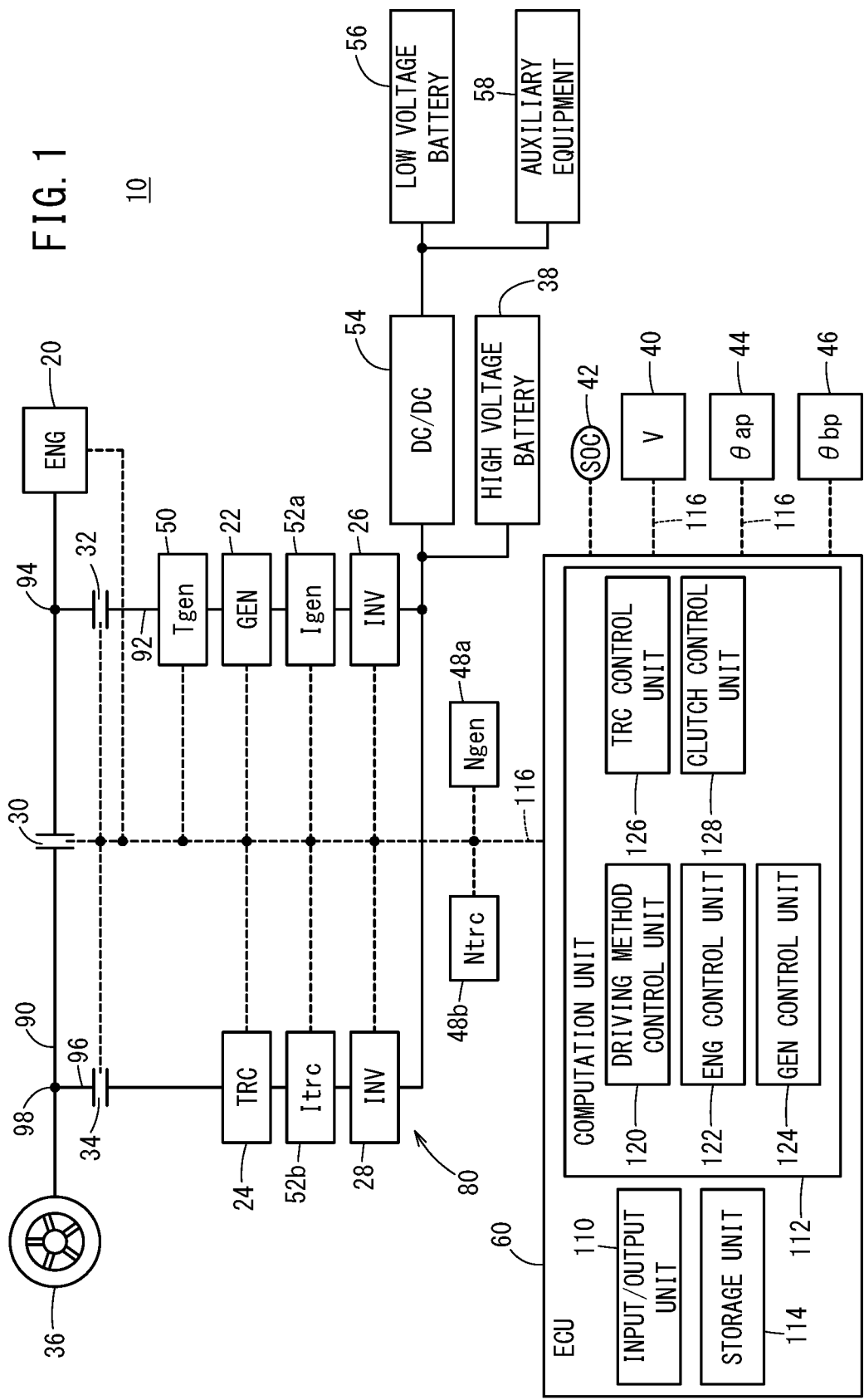
FIG. 1 is a schematic configuration diagram of a vehicle according to an embodiment of the present invention.

FIG. 1 is a schematic configuration diagram of a vehicle 10 according to an embodiment of the present invention. The vehicle 10 is a so-called hybrid vehicle. The vehicle 10 includes an engine 20, a first rotary electric machine 22, a second rotary electric machine 24, a first inverter 26, a second inverter 28, a first clutch 30, a second clutch 32, a third clutch 34, a vehicle wheel 36, a high voltage battery 38, a vehicle velocity sensor 40, an SOC (state of charge) sensor 42, an AP (accelerator pedal) operation amount sensor 44, a BP (brake pedal) operation amount sensor 46, rotational speed sensors 48a, 48b, a torque sensor 50, current sensors 52a, 52b, a step-down converter 54, a low voltage battery 56, electrical auxiliary equipment 58, and an electronic control unit 60 (hereinafter referred to as an "ECU 60").

Hereinafter, the engine 20, the first rotary electric machine 22, the second rotary electric machine 24, the first clutch 30, the second clutch 32, and the third clutch 34 will be collectively referred to as a drive system 80. Further, a power transmission path connecting the engine 20 and the vehicle wheel 36 is referred to as a first transmission path 90. The first transmission path 90 transmits the motive power Feng generated by the engine 20 to the vehicle wheel 36. Furthermore, a power transmission path connecting the first rotary electric machine 22 and a first branch point 94, which is more on a side of the engine 20 than the first clutch 30 within the first transmission path 90, is referred to as a second transmission path 92. Further still, a power transmission path connecting the second rotary electric machine 24 and a second branch point 98, which is more on a side of the vehicle wheel 36 than the first clutch 30 within the first transmission path 90, is referred to as a third transmission path 96.

Figure 2:
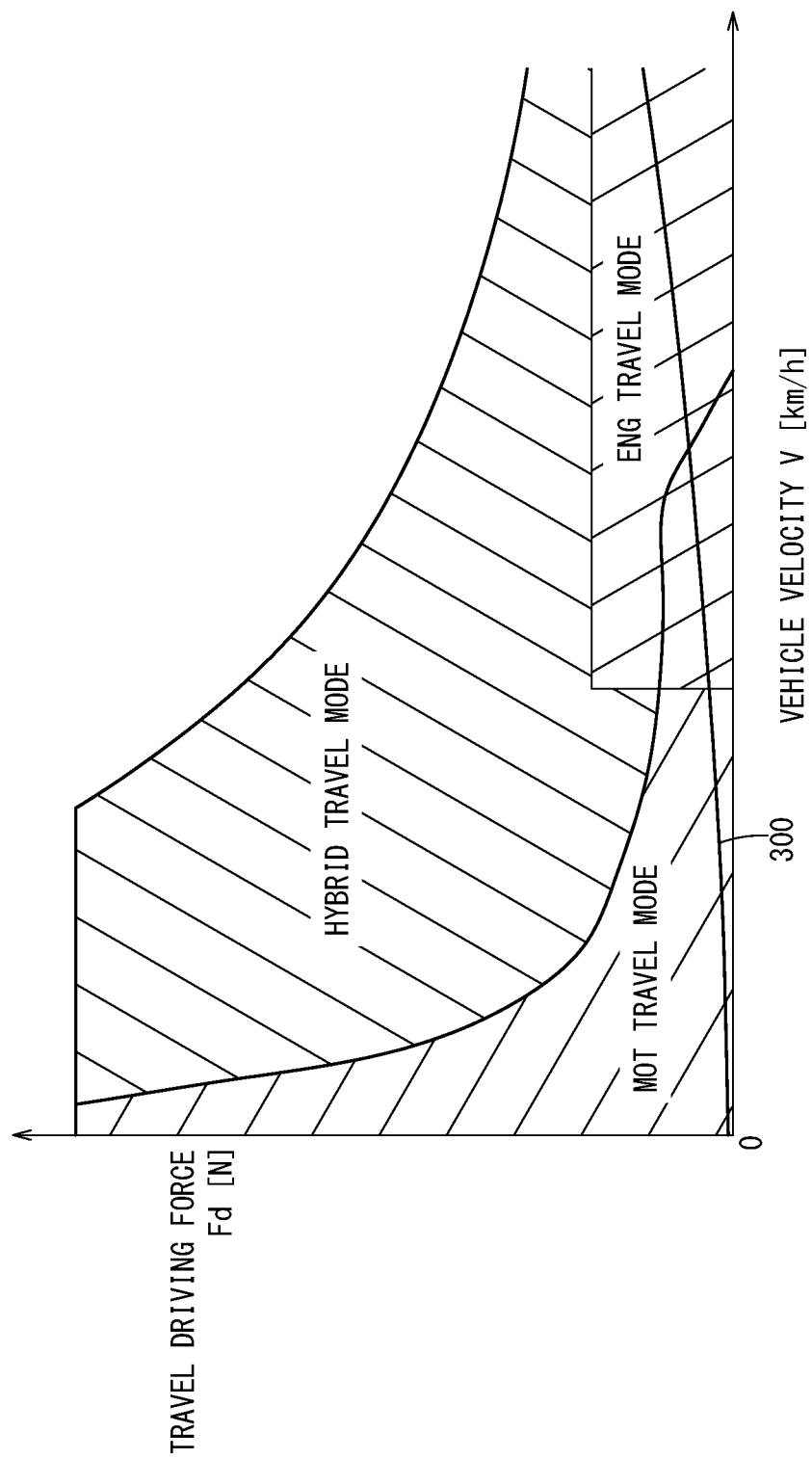
FIG. 2 is a diagram for explaining a travel mode selection method that is used in the present embodiment.

The configuration of the drive system 80 and the like can be the same configuration as disclosed, for example, in Japanese Laid Open Patent Publication No. 2017-100590 or International Publication No. WO 2012/053361 (for example, see FIG. 2 of Japanese Laid-Open Patent Publication No. 2017-100590).

[A-1-2. Engine 20]

The engine 20 generates the motive power Feng as a first drive source for enabling the vehicle 10 to travel, and supplies the motive power Feng to the vehicle wheel 36 (drive wheel). Further, by the motive power Feng, the engine 20 operates the first rotary electric machine 22 to thereby generate electrical power. Hereinafter, "ENG" or "eng" will be appended to parameters related to the engine 20. Further, in FIG. 1, etc., the engine 20 is indicated by "ENG".

[A-1-3. First Rotary Electric Machine 22]

The first rotary electric machine 22 is a three-phase AC brushless type rotary electric machine, and functions as a generator that generates electrical power by the motive power Feng from the engine 20. The electrical power Pgen generated by the first rotary electric machine 22 is supplied via the first inverter 26 to the high voltage battery 38 (hereinafter also referred to as a "battery 38"), the second rotary electric machine 24, or the electrical auxiliary equipment 58. The first rotary electric machine 22 is an interior permanent magnet synchronous motor (IPMSM). The first rotary electric machine 22 includes a stator and a rotor, neither of which are shown.

Hereinafter, the first rotary electric machine 22 may also be referred to as a generator 22. In addition to or instead of its function as a generator, the first rotary electric machine 22 may also function as a traction motor. Hereinafter, "GEN" or "gen" will be appended to parameters related to the generator 22. Further, in FIG. 1, etc., the generator 22 is indicated by "GEN". The generator 22 can be used as a starter motor for the engine 20.

[A-1-4. Second Rotary Electric Machine 24]

The second rotary electric machine 24 is a three-phase AC brushless type rotary electric machine, generates motive power Ftrc as a second drive source for enabling the vehicle 10 to travel, and supplies the generated motive power Ftrc to the vehicle wheel 36 (drive wheel). More specifically, the second rotary electric machine 24 functions as a traction motor, which is driven by one or both of the electrical power Pbat from the high voltage battery 38 and the electrical power Pgen from the generator 22. Further, the second rotary electric machine 24 regenerates power during braking of the vehicle 10, and supplies regenerative electrical power Preg to the battery 38 via the second inverter 28. The regenerative electrical power Preg may also be supplied to the electrical auxiliary equipment 58 (hereinafter also referred to as "auxiliary equipment 58"). In the same manner as the generator 22, the second rotary electric machine 24 is an interior permanent magnet synchronous motor (IPMSM). The second rotary electric machine 24 includes a stator and a rotor, neither of which are shown. Hereinafter, the second rotary electric machine 24 may also be referred to as a traction motor 24 or a TRC motor 24.

In addition to or instead of its function as a traction motor, the second rotary electric machine 24 may also function as a generator. Hereinafter, "TRC" or "trc" will be appended to parameters related to the traction motor 24. Further, in FIG. 1, etc., the traction motor 24 is indicated by "TRC".

[A-1-5. First Inverter 26 and Second Inverter 28]

The first inverter 26 and the second inverter 28 are of a three phase full bridge type configuration and perform DC/AC conversion. More specifically, the first inverter 26 and the second inverter 28 convert the direct current from the high voltage battery 38 into a three-phase alternating current, and supply the alternating current to the first rotary electric machine 22 and the second rotary electric machine 24. Further, the first inverter 26 and the second inverter 28 supply to the battery 38 a direct current after AC/DC conversion thereof, accompanying a power generating operation (or a power regenerating operation) of the first rotary electric machine 22 and the second rotary electric machine 24.

[A-1-6. First Clutch 30, Second Clutch 32, and Third Clutch 34]

The first clutch 30 (first switching device) is disposed on the first transmission path 90, and on the basis of a command from the ECU 60, switches between a connected state and a disconnected state between the engine 20 and the vehicle wheel 36. Hereinafter, the first clutch 30 is also referred to as an ENG clutch 30 or a COM clutch 30. In this instance, the abbreviation "COM" implies a clutch that is used "commonly" (in common) with the engine 20 and the generator 22.

The second clutch 32 (second switching device) is disposed on the second transmission path 92, and on the basis of a command from the ECU 60, switches between a connected state and a disconnected state between the first transmission path 90 and the generator 22. Hereinafter, the second clutch 32 is also referred to as a GEN clutch 32.

The third clutch 34 (third switching device) is disposed on the third transmission path 96, and on the basis of a command from the ECU 60, switches between a connected state and a disconnected state between the first transmission path 90 and the traction motor 24. Hereinafter, the third clutch 34 is also referred to as a TRC clutch 34.

[A-1-7. High Voltage Battery 38]

The high voltage battery 38 is a power storage device (energy storage) including a plurality of battery cells, and is capable of outputting a high voltage (several hundreds of volts). For the high voltage battery 38, there can be used, for example, a lithium ion secondary battery, a nickel hydrogen secondary battery, an all-solid battery, or the like. In addition to or instead of the battery 38, a power storage device such as a capacitor or the like can be used.

[A-1-8. Various Sensors]

The vehicle velocity sensor 40 detects the vehicle velocity V [km/h] of the vehicle 10, and transmits the detected vehicle velocity V to the ECU 60. The SOC sensor 42 is constituted from a non-illustrated current sensor or the like, and detects the state of charge (SOC) of the battery 38, and transmits the detected state of charge to the ECU 60.

The AP operation amount sensor 44 detects an amount of depression (AP operation amount θap) [deg] or [%] from an original position of a non-illustrated accelerator pedal, and transmits the detected amount of depression to the ECU 60. The BP operation amount sensor 46 detects an amount of depression (BP operation amount θbp) [deg] or [%] from an original position of a non-illustrated brake pedal, and transmits the detected amount of depression to the ECU 60.

The rotational speed sensor 48a detects a rotational speed Ngen [rpm] as a rotational speed per unit time of the generator 22, and transmits the detected rotational speed Ngen to the ECU 60. The rotational speed sensor 48b detects a rotational speed Ntrc [rpm] as a rotational speed per unit time of the traction motor 24, and transmits the detected rotational speed Ntrc to the ECU 60.

The torque sensor 50 is provided on the second transmission path 92, and detects a torque Tgen (hereinafter also referred to as a "detected torque Tgen" or a "GEN torque Tgen"). The torque sensor 50 of the present embodiment is a magnetostrictive type of torque sensor arranged on an input/output shaft (not shown) of the generator 22. More specifically, the torque sensor 50 includes a plurality of magnetostrictive films (not shown) which are formed on the input/output shaft, and a plurality of coils (not shown) arranged in facing relation to the input/output shaft. Concerning the specific configuration of the torque sensor 50, for example, the configuration described in Japanese Laid-Open Patent Publication No. 2009-264812 can be applied.

The current sensor 52a detects a current Igen (hereinafter also referred to as a "GEN current Igen") flowing between the generator 22 and the first inverter 26. The current sensor 52b detects a current Itrc (hereinafter also referred to as a "TRC current Itrc") flowing between the traction motor 24 and the second inverter 28.

[A-1-9. Step-Down Converter 54, Low Voltage Battery 56, and Electrical Auxiliary Equipment 58]

The step-down converter 54 steps down a battery voltage Vbat, a generated voltage Vgen, or a regenerative voltage Vreg, and supplies the stepped-down voltage to the electrical auxiliary equipment 58. The battery voltage Vbat is an output voltage from the battery 38, the generated voltage Vgen is an output voltage occurring at a time that electrical power is generated by the generator 22, and the regenerative voltage Vreg is an output voltage of the traction motor 24 occurring at a time that power is regenerated. Among the auxiliary equipment 58, there are included, for example, lights, an air conditioner, a navigation device, an audio device, and the like.

[A-1-10. ECU 60]

The ECU 60 is a control device (or a control circuit) that controls the drive system 80 in its entirety, and includes an input/output unit 110, a computation unit 112, and a storage unit 114. The input/output unit 110 inputs and outputs signals to and from respective components of the vehicle 10 via a signal line 116 (communications line). The input/output unit 110 comprises a non-illustrated A/D conversion circuit that converts input analog signals into digital signals.

The computation unit 112 includes a central processing unit (CPU) and operates by executing programs stored in the storage unit 114. A portion of the functions executed by the computation unit 112 can also be realized using logic ICs (Integrated Circuits). The programs may be supplied from the exterior via a non-illustrated wireless communications device (mobile phone, smartphone, or the like). In the computation unit 112, a portion of the programs may be constituted by hardware (circuit components).

As shown in FIG. 1, the computation unit 112 includes a driving method control unit 120, an engine control unit 122, a generator control unit 124, a traction motor control unit 126, and a clutch control unit 128.

The driving method control unit 120 controls the driving method of the vehicle 10. In this instance, the driving method includes a driving method using the engine 20, a driving method using the traction motor 24, and a driving method using the engine 20 and the traction motor 24. Details thereof will be described later with reference to FIG. 2, etc.

The engine control unit 122 (hereinafter also referred to as an "ENG control unit 122") controls the engine 20 on the basis of commands from the driving method control unit 120. The generator control unit 124 (hereinafter also referred to as a "GEN control unit 124") controls the generator 22 on the basis of commands from the driving method control unit 120. The GEN control unit 124 of the present embodiment executes an ENG pulsation suppression control. The ENG pulsation suppression control is a control to suppress pulsations in the ENG torque Teng using the generator 22 when the first clutch 30 is in a connected state in an ENG travel mode, as will be described later (details thereof will be discussed later with reference to FIGS. 3 and 4).

The traction motor control unit 126 (hereinafter also referred to as a "TRC control unit 126") controls the traction motor 24 on the basis of commands from the driving method control unit 120. The clutch control unit 128 controls the first through third clutches 30, 32, 34 on the basis of commands from the driving method control unit 120.

The storage unit 114 stores programs and data used by the computation unit 112, and includes a random access memory (hereinafter referred to as a "RAM"). As the RAM, a volatile memory such as a register or the like, and a nonvolatile memory such as a flash memory or the like can be used. Further, in addition to the RAM, the storage unit 114 may also include a read only memory (ROM).

<A-2. Travel Modes>

[A-2-1. Outline]

FIG. 2 is a diagram for explaining a travel mode selection method that is used in the present embodiment. According to the present embodiment, a MOT travel mode, a hybrid travel mode, an ENG travel mode, and a power regeneration mode are used. As shown in FIG. 2, the MOT travel mode, the hybrid travel mode, and the ENG travel mode are selected primarily in accordance with the vehicle velocity V and a travel driving force Fd of the vehicle 10.

It should be noted that the travel driving force Fd may be any one of an actual measurement value, an estimated value, or a required value. Further, although the units of the travel driving force Fd are stated herein as "Newtons (N)", the travel driving force Fd may be expressed in units of "Nm" as a torque. In the case that the travel driving force Fd is a required value, the ECU 60 calculates the travel driving force Fd using the vehicle velocity V, the AP operation amount θap, and the BP operation amount θbp, etc.

Further, in FIG. 2, a travel resistance line 300 is shown. The travel resistance line 300 is indicative of a resistance Rt (hereinafter also referred to as a "travel resistance Rt") that the vehicle 10 receives when traveling on a specified type of travel path (for example, a flat asphalt road). When an acceleration due to the travel driving force Fd of the vehicle 10 is in equilibrium with a deceleration due to the travel resistance Rt, the vehicle 10 travels at a constant velocity. Stated otherwise, in order for the vehicle 10 to travel at a constant velocity at a specified vehicle velocity V, the vehicle 10 may be made to travel in a manner so that the travel driving force Fd corresponds to the specified vehicle velocity V on the travel resistance line 300.

[A-2-2. MOT Travel Mode]

The MOT travel mode (rotary electric machine travel mode) is a mode in which the traction motor 24 drives the vehicle 10 primarily by the electrical power Pbat from the high voltage battery 38. As shown in FIG. 2, the MOT travel mode is used when traveling at a low velocity or a medium velocity, when traveling while coasting (with charging), and when traveling while coasting (without charging). Further, the MOT travel mode includes the control patterns PA11, PA12, and PA13.

In the control pattern PA11 (rotary electric machine cruising travel mode), the ENG clutch 30 and the GEN clutch 32 are disconnected (turned OFF), and the TRC clutch 34 is engaged (turned ON). The control pattern PA11 is utilized, for example, at times of low velocity traveling and medium velocity traveling (including low velocity cruising and medium velocity cruising).

In the control pattern PA12, the ENG clutch 30, the GEN clutch 32, and the TRC clutch 34 are turned ON. The control pattern PA12 is utilized, for example, at a time of low velocity acceleration. In this case, in addition to the motive power Ftrc of the traction motor 24 and the motive power Feng of the engine 20, motive power Fgen from the generator 22 is also used in driving the vehicle 10, whereby a particularly large vehicle driving force can be generated. Moreover, the control pattern PA12 may be perceived as pertaining to the ENG travel mode.

The term low velocity as mentioned herein refers to, for example, a range that is greater than 0 km/h and less than any value from 10 to 20 km/h. Further, the term medium velocity refers to, for example, a range that is greater than an upper limit value of the low velocity and less than any value from 60 to 120 km/h. Furthermore, the term high velocity as will be discussed later refers to, for example, a range that is greater than an upper limit value of the medium velocity and less than a high velocity upper limit value of the vehicle 10.

In the control pattern PA13, the ENG clutch 30, the GEN clutch 32, and the TRC clutch 34 are turned OFF. In accordance therewith, it becomes possible to improve the travel efficiency (or the actual fuel consumption) of the vehicle 10, for example, by causing the vehicle 10 to travel while coasting, without being accompanied by generation of electrical power in the generator 22 or the traction motor 24.

[A-2-3. Hybrid Travel Mode]

In the hybrid travel mode, while the generator 22 is generating electrical power by the motive power Feng of the engine 20, the traction motor 24 drives the vehicle 10 using the generated electrical power. As shown in FIG. 2, the hybrid travel mode is used at a time of medium velocity acceleration and at a time of high velocity acceleration. The hybrid travel mode includes a control pattern PA21 (rotary electric machine cruising travel mode). In the control pattern PA21, while the ENG clutch 30 (COM clutch 30) is turned OFF, the GEN clutch 32 and the TRC clutch 34 are turned ON. In accordance therewith, although the engine 20 is connected to the generator 22, the engine 20 is disconnected from the vehicle wheel 36.

[A-2-4. ENG Travel Mode]

The ENG travel mode (internal combustion engine travel mode) is a mode in which the vehicle travels using the engine 20 as a principal driving source. The ENG travel mode is used, for example, at a time of high velocity acceleration, at a time of high velocity cruising, and at a time of battery charging. The ENG travel mode includes the control patterns PA31 to PA34.

In the control pattern PA31, while the ENG clutch 30 and the TRC clutch 34 are turned ON, the GEN clutch 32 is turned OFF. In accordance therewith, for example, acceleration at high velocity is made possible.

In the control pattern PA32, while the ENG clutch 30 is turned ON, the GEN clutch 32 and the TRC clutch 34 are turned OFF. In accordance therewith, for example, high velocity cruising is made possible. Such high velocity cruising may be related to only a portion of a velocity region, even within a range that is greater than an upper limit value of the medium velocity and less than a vehicle velocity upper limit value of the vehicle 10. Moreover, according to the present specification, a case in which the vehicle velocity V is constant, and a case in which the vehicle velocity V fluctuates within a predetermined range are included within the definition of cruising.

In the control pattern PA33, while the ENG clutch 30 and the GEN clutch 32 are turned ON, the TRC clutch 34 is turned OFF. In accordance therewith, it becomes possible to carry out charging of the high voltage battery 38 or the like.

In the control pattern PA34, while the ENG clutch 30 and the TRC clutch 34 are turned OFF, the GEN clutch 32 is turned ON. In accordance therewith, for example, when the vehicle 10 is traveling while coasting, the generator 22 generates electrical power by the motive power Feng of the engine 20, whereby it becomes possible to carry out charging of the high voltage battery 38 or the like.

[A-2-5. Power Regeneration Mode]

The power regeneration mode is a mode that is used when the vehicle 10 is decelerating. The power regeneration mode includes the control pattern PA41. In the control pattern PA41, while the ENG clutch 30 and the GEN clutch 32 are turned OFF, the TRC clutch 34 is turned ON. In accordance therewith, by performing regeneration of power by the traction motor 24, it becomes possible to carry out charging of the high voltage battery 38 or the like.

<A-3. Controls in the Present Embodiment>

[A-3-1. Overview]

As discussed above, in the present embodiment, the ECU 60 switches the driving method of the vehicle 10 in accordance with the vehicle velocity V and the travel driving force Fd of the vehicle 10 (travel information of the vehicle 10) (see FIG. 2).

[A-3-2. ENG Pulsation Suppression Control]

(A-3-2-1. Overall Flow of ENG Pulsation Suppression Control)

Next, the ENG pulsation suppression control will be described. The ENG pulsation suppression control is a control to suppress pulsations in the ENG torque Teng by using the generator 22 when the first clutch 30 is in a connected state in the ENG travel mode. In addition, in the ENG pulsation suppression control according to the present embodiment, it is assumed as a premise that the second clutch 32 is in a connected state, and the generator 22 is connected to the first transmission path 90.

Figure 3:
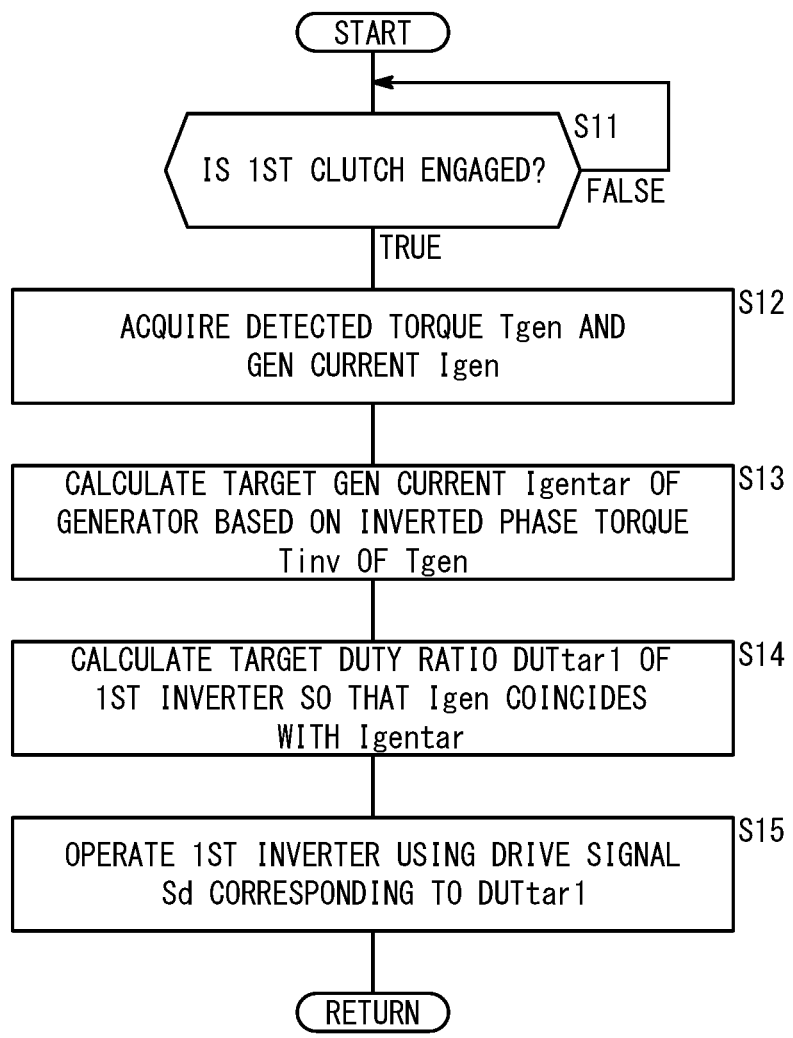
FIG. 3 is a flowchart of an ENG pulsation suppression control in the present embodiment.

FIG. 3 is a flowchart of the ENG pulsation suppression control according to the present embodiment. In step S11, the ECU 60 determines whether or not the first clutch 30 is in an engaged state (or a connected state). In the manner described above, the case in which the first clutch 30 is engaged is basically the case of the ENG travel mode. If the first clutch 30 is in a disengaged state (step S11: FALSE), step S11 is repeated. If the first clutch 30 is in an engaged state (step S11: TRUE), the process proceeds to step S12.

In step S12, the ECU 60 acquires the detected torque Tgen from the torque sensor 50 and the GEN current Igen from the first current sensor 52*a*. Since the torque sensor 50 is disposed on the second transmission path 92, the detected torque Tgen is capable of indicating pulsations of the engine 20. In step S13, the ECU 60 calculates the target GEN current Igentar of the generator 22 on the basis of the inverted phase torque Tinv of the detected torque Tgen. Details concerning step S13 will be described later in reference to a calculation performed with the configuration shown in FIG. 4.

In step S14, the ECU 60 calculates a target duty ratio DUTtar1 of the first inverter 26 in a manner so that the GEN current Igen coincides with the target GEN current Igentar. For example, in the case that a difference ΔI between the GEN current Igen and the target GEN current Igentar is positive under a condition in which the generator 22 is being rotated in a forward direction, the target duty ratio DUTtar1 is decreased. In the case that the difference ΔI between the GEN current Igen and the target GEN current Igentar is negative under a condition in which the generator 22 is being rotated in the forward direction, the target duty ratio DUTtar1 is increased.

In either of these cases, although it is kept in mind that the sum of the detected torque Tgen and the inverted phase torque Tinv should be zero, a control may be provided in which the sum of the detected torque Tgen and the inverted phase torque Tinv becomes a value close to zero.

In step S15, the ECU 60 operates the first inverter 26 using a drive signal Sd corresponding to the target duty ratio DUTtar1.

(A-3-2-2. Specific Process of ENG Pulsation Suppression Control)

Figure 4:
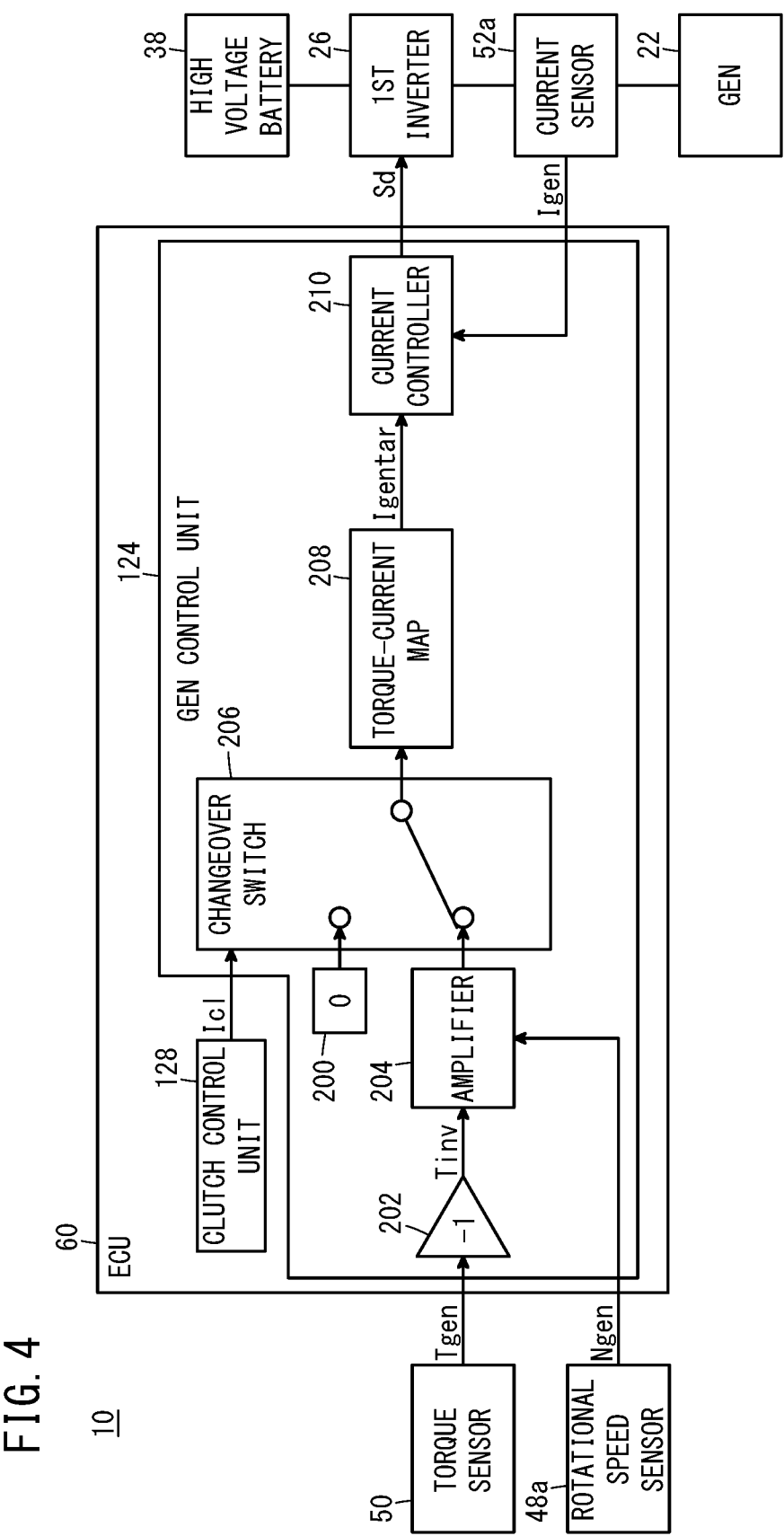
FIG. 4 is a block diagram showing functional blocks of an electronic control device for the purpose of executing the ENG pulsation suppression control according to the present embodiment.

FIG. 4 is a block diagram showing functional blocks of the ECU 60 for the purpose of executing the ENG pulsation suppression control according to the present embodiment. As shown in FIG. 4, the GEN control unit 124 of the ECU 60 includes a reset unit 200, an inverter 202, an amplifier 204, a changeover switch 206, a torque-current map 208, and a current controller 210.

The reset unit 200 outputs zero as the value of the inverted phase torque Tinv to the changeover switch 206. The inverter 202 calculates the inverted phase torque Tinv by inverting the detected torque Tgen from the torque sensor 50. The amplifier 204 multiplies the inverted phase torque Tinv by a gain G corresponding to the rotational speed Ngen of the generator 22, and outputs the result to the changeover switch 206. The amplifier 204 is set in consideration of the inertia of the generator 22. Stated otherwise, the amplifier 204 compensates for the inertia of the rotor of the generator 22.

The changeover switch 206 selects between the output from the reset unit 200 and the output from the amplifier 204, on the basis of connection information Ic1 of the first clutch 30 as notified from the clutch control unit 128, and outputs the selected value to the torque-current map 208. More specifically, in the case that the connection information Ic1 indicates a disconnected state of the first clutch 30, the changeover switch 206 outputs the output from the reset unit 200 to the torque-current map 208. Further, in the case that the connection information Ic1 indicates a connected state of the first clutch 30, the changeover switch 206 outputs the output from the amplifier 204 to the torque-current map 208.

The torque-current map 208 has previously stored therein a relationship between the inverted phase torque Tinv and the target GEN current Igentar. In addition, the torque-current map 208 reads out the target GEN current Igentar corresponding to the inverted phase torque Tinv (more accurately, Tinv×G) that was input from the changeover switch 206, and outputs the target GEN current Igentar to the current controller 210. The current controller 210 calculates the difference ΔI between the GEN current Igen from the current sensor 52a and the target GEN current Igentar received from the torque-current map 208. In addition, the current controller 210 calculates the target duty ratio DUTtar1 corresponding to the difference ΔI, and outputs a drive signal Sd corresponding to the target duty ratio DUTtar1 to the first inverter 26.

The first inverter 26 turns ON a switching element (not shown) in the first inverter 26 in accordance with the drive signal Sd, and supplies the current from the high voltage battery 38 to the generator 22.

<A-4. Advantages and Effects of the Present Embodiment>

According to the present embodiment, when the first clutch 30 (first switching device) is placed in a connected state and the vehicle wheel 36 is driven from the engine 20 (internal combustion engine) (step S11 of FIG. 3: TRUE), the generator 22 (first rotary electric machine) is made to generate the inverted phase torque Tinv which is opposite in phase to the detected torque Tgen detected by the torque sensor 50 (steps S13 to S15 of FIG. 3, and FIG. 4). Because the torque sensor 50 is disposed on the second transmission path 92 (see FIG. 1), in the case that the detected torque Tgen is not used for generating electrical power or the like by the generator 22, the detected torque Tgen is indicative of pulsations of the engine 20. Accordingly, by causing the inverted phase torque Tinv, which is opposite in phase to the detected torque Tgen, to be generated in the generator 22, pulsations of the engine 20 can be suppressed and the vehicle wheel 36 can be smoothly rotated.

In the present embodiment, the torque sensor 50 is a magnetostrictive torque sensor disposed on the input/output shaft of the generator 22 (first rotary electric machine) (see FIG. 1). In accordance with this feature, it is possible to detect the torque Tgen of the generator 22 with high accuracy, and to effectively generate the inverted phase torque Tinv.

In the present embodiment, the first branch point 94 is provided more on a side of the engine 20 than the first clutch 30 (first switching device) within the first transmission path 90 (see FIG. 1). Further, the vehicle 10 includes the second rotary electric machine 24, and the third transmission path 96 connecting the second rotary electric machine 24 and the second branch point 98 located more on a side of the vehicle wheel 36 than the first clutch 30 within the first transmission path 90. Furthermore, on the basis of the vehicle velocity V and the travel driving force Fd (travel information of the vehicle 10), the ECU 60 (control device) may switch between the MOT travel mode in which the vehicle wheel 36 is driven from the second rotary electric machine 24 in a state in which the first clutch 30 is in a disconnected state, and the ENG travel mode in which the vehicle wheel 36 is driven from the engine 20 in a state in which the first clutch 30 is in a connected state (see FIG. 2).

In accordance with these features, in the MOT travel mode, the torque sensor 50 is disconnected from the power transmission path to the vehicle wheel 36, whereas in the ENG travel mode, the torque sensor 50 is connected with the power transmission path to the vehicle wheel 36. Accordingly, in comparison with a case of being disposed in the third transmission path 96 or the like, it becomes easier for the torque sensor 50 to detect a change when switching from the MOT travel mode to the ENG travel mode.

In the present embodiment, when the first clutch 30 (first switching device) is placed in a connected state and the vehicle wheel 36 is driven from the engine 20 (internal combustion engine) (step S11 of FIG. 3: TRUE), the ECU 60 (control device) calculates the target GEN current Igentar (an index) corresponding to the inverted phase torque Tinv (current controller 210 of FIG. 4), in a manner so that a sum of the detected torque Tgen and the inverted phase torque Tinv becomes zero or a value close to zero. In accordance with this feature, when the torque Tgen transmitted from the first transmission path 90 to the second transmission path 92 is not used for generating electrical power by the generator 22, pulsations of the engine 20 can be suppressed, and the vehicle wheel 36 can be smoothly rotated.

B. Modifications

It is a matter of course that the present invention is not limited to the above-described embodiment, and various modified or additional configurations could be adopted therein based on the descriptive content of the present specification. For example, the following configurations can be adopted.

<B-1. Objects to which the Present Invention is Applied>

The vehicle 10 of the above-described embodiment includes the engine 20, the generator 22, and the traction motor 24 (see FIG. 1). However, for example, from the standpoint of generating the inverted phase torque Tinv from the first rotary electric machine 22 or the second rotary electric machine 24, the present invention is not limited to this feature. For example, as shown in FIG. 10 of Japanese Laid-Open Patent Publication No. 2017-100590, the vehicle 10 may be configured to include the engine 20 and a single rotary electric machine. Alternatively, a configuration is also possible that includes the engine 20 and three rotary electric machines.

The vehicle 10 in the above-described embodiment was a so-called hybrid vehicle (see FIG. 1). However, for example, from the standpoint of generating the inverted phase torque Tinv from a rotary electric machine, the present invention is not limited to this feature, and the vehicle 10 may be an engine vehicle which is not driven by the rotary electric machine.

<B-2. Rotary Electric Machines>

The first rotary electric machine 22 and the second rotary electric machine 24 of the above-described embodiment are three-phase AC brushless type rotary electric machines. However, for example, from the standpoint of generating the inverted phase torque Tinv from the first rotary electric machine 22 or the second rotary electric machine 24, the present invention is not limited to this feature. The first rotary electric machine 22 and the second rotary electric machine 24 may be of a direct current type or a brush type.

Both of the first rotary electric machine 22 and the second rotary electric machine 24 of the above-described embodiment are interior permanent magnet type synchronous motors (IPMSM). However, for example, from the standpoint of generating the inverted phase torque Tinv from the first rotary electric machine 22 or the second rotary electric machine 24, the present invention is not limited to this feature. The first rotary electric machine 22 and the second rotary electric machine 24 may be other types of rotary electric machines.

<B-3. Clutches>

According to the above-described embodiment, the first through third clutches 30, 32, 34 are provided (see FIG. 1). However, for example, from the standpoint of generating the inverted phase torque Tinv from the first rotary electric machine 22 or the second rotary electric machine 24, the present invention is not limited to this feature. For example, the second clutch 32 or the third clutch 34 can be omitted.

In the above-described embodiment, the traction motor 24 and the third clutch 34 are connected to the second branch point 98 between the ENG clutch 30 and the vehicle wheel 36 (see FIG. 1). However, for example, from the standpoint of generating the inverted phase torque Tinv from the first rotary electric machine 22 or the second rotary electric machine 24, the present invention is not limited to this feature. For example, the second branch point 98 may be located more on a side of the engine 20 than the ENG clutch 30.

<B-4. Torque Sensor 50>

In the above-described embodiment, the torque sensor 50 is a magnetostrictive torque sensor. However, for example, from the standpoint of generating the inverted phase torque Tinv from the first rotary electric machine 22 or the second rotary electric machine 24, the present invention is not limited to this feature. For example, the torque sensor 50 can utilize other types of detection methods.

In the above-described embodiment, the torque sensor 50 is disposed on the input/output shaft of the generator 22 (see FIG. 1). However, for example, from the standpoint of generating the inverted phase torque Tinv from the first rotary electric machine 22 or the second rotary electric machine 24, the present invention is not limited to this feature. For example, the torque sensor 50 may be disposed on the second transmission path 92 at a location other than the input/output shaft of the generator 22.

<B-5. ENG Pulsation Suppression Control>

In the above-described embodiment, the generator 22 serves as the control target of the ENG pulsation suppression control (see FIGS. 3 and 4). However, for example, from the standpoint of generating the inverted phase torque Tinv from a rotary electric machine, the present invention is not limited to this feature. For example, it is also possible for the traction motor 24 to serve as the control target of the ENG pulsation suppression control, and for the traction motor 24 to generate the inverted phase torque Tinv.

In the above-described embodiment, when the first clutch 30 is engaged (step S11 of FIG. 3: TRUE), the inverted phase torque Tinv is generated from the generator 22 (steps S12 to S15 of FIG. 3, and FIG. 4). Stated otherwise, a case in which the generator 22 is generating electrical power was not touched upon. However, for example, taking into consideration a case in which the generator 22 is generating electrical power, the ECU 60 (control device) may operate in the following manner.

More specifically, when the first clutch 30 is placed in a connected state and the vehicle wheel 36 is driven from the engine 20, the ECU 60 determines whether or not generation of electrical power by the first rotary electric machine 22 is required. In the case it is determined that generation of electrical power by the first rotary electric machine 22 is required, the ECU 60 calculates the target GEN torque Tgentar of the first rotary electric machine 22 by adding the inverted phase torque Tinv to the target generated torque of the first rotary electric machine 22. In the case it is determined that generation of electrical power by the first rotary electric machine 22 is not required, the ECU 60 calculates the target GEN torque Tgentar in a manner so that the sum of the detected torque Tgen and the inverted phase torque Tinv becomes zero or a value close to zero.

In accordance with these features, it becomes possible to suppress pulsations of the engine 20 and to smoothly rotate the vehicle wheel 36, both in the case that generation of electrical power by the first rotary electric machine 22 is required, as well as in the case that generation of electrical power is not required.

What is claimed is:

1. A vehicle comprising:
   an internal combustion engine;
   a first transmission path configured to transmit power generated by the internal combustion engine to a vehicle wheel;
   a first switching device disposed on the first transmission path, and configured to switch between a connected state and a disconnected state between the internal combustion engine and the vehicle wheel;
   a first rotary electric machine;
   a second transmission path connecting the first rotary electric machine and a first branch point on the first transmission path; and
   a control device configured to control the internal combustion engine, the first switching device, and the first rotary electric machine;
   the vehicle further comprising a torque sensor configured to detect a torque, and which is disposed on the second transmission path;
   wherein, when the first switching device is placed in a connected state and the vehicle wheel is driven by the internal combustion engine, the control device causes an inverted phase torque, which is opposite in phase to a detected torque detected by the torque sensor, to be generated in the first rotary electric machine.

2. The vehicle according to claim 1, wherein the torque sensor is a magnetostrictive torque sensor disposed on an input/output shaft of the first rotary electric machine.

3. The vehicle according to claim 1, wherein:
the first branch point is provided more on a side of the internal combustion engine than the first switching device within the first transmission path; and
the vehicle further comprising:
a second rotary electric machine; and
a third transmission path connecting the second rotary electric machine and a second branch point located more on a side of the vehicle wheel than the first switching device within the first transmission path;
wherein on a basis of travel information of the vehicle, the control device is configured to switch between:
a rotary electric machine travel mode in which the vehicle wheel is driven by the second rotary electric machine in a state in which the first switching device is in a disconnected state; and
an internal combustion engine travel mode in which the vehicle wheel is driven by the internal combustion engine in a state in which the first switching device is in a connected state.

4. The vehicle according to claim 1, wherein, when the first switching device is placed in a connected state and the vehicle wheel is driven by the internal combustion engine, the control device calculates a target value of the inverted phase torque or an index corresponding thereto, in a manner so that a sum of the detected torque and the inverted phase torque becomes zero or a value close to zero.

5. A control method for controlling a vehicle, wherein the vehicle comprises:
an internal combustion engine;
a first transmission path configured to transmit power generated by the internal combustion engine to a vehicle wheel;
a first switching device disposed on the first transmission path, and configured to switch between a connected state and a disconnected state between the internal combustion engine and the vehicle wheel;
a first rotary electric machine;
a second transmission path connecting the first rotary electric machine and a first branch point on the first transmission path; and
a control device configured to control the internal combustion engine, the first switching device, and the first rotary electric machine;
the vehicle further comprising a torque sensor configured to detect a torque, and which is disposed on the second transmission path;
wherein, when the first switching device is placed in a connected state and the vehicle wheel is driven by the internal combustion engine, the control device performs a step of causing an inverted phase torque, which is opposite in phase to a detected torque detected by the torque sensor, to be generated in the first rotary electric machine.

* * * * *